Figure 1:
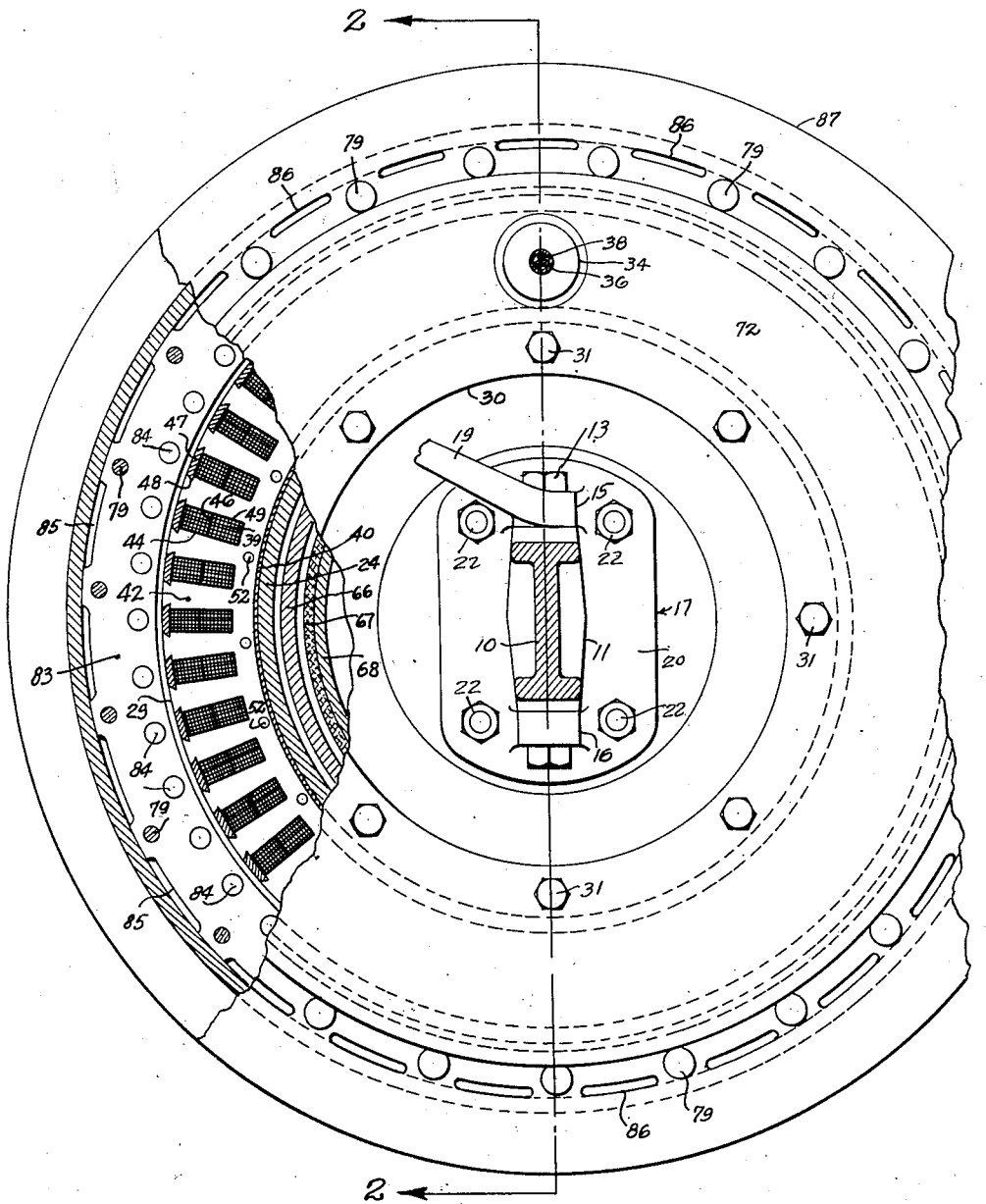

May 2, 1950      F. L. GLADISH      2,506,146
MOTOR-DRIVEN VEHICLE WHEEL

Filed April 2, 1947      2 Sheets-Sheet 1

Inventor
Frank L. Gladish
Barthel + Bugbee
Attorneys

May 2, 1950     F. L. GLADISH     2,506,146
MOTOR-DRIVEN VEHICLE WHEEL

Filed April 2, 1947     2 Sheets-Sheet 2

Inventor
Frank L. Gladish
Barthel + Bugbee
Attorneys

Patented May 2, 1950

2,506,146

UNITED STATES PATENT OFFICE 2,506,146

MOTOR-DRIVEN VEHICLE WHEEL

Frank L. Gladish, Detroit, Mich., assignor of one-half to Thomas F. Brady, Detroit, Mich.

Application April 2, 1947, Serial No. 738,803

3 Claims. (Cl. 172—287)

This invention relates to vehicle wheels, and in particular to electric-motor-driven vehicle wheels.

One object of this invention is to provide an electric-motor-driven vehicle wheel which is suitable for automobile or airplane use and which contains a built-in alternating current motor which is energized from an alternating current generator driven by the vehicle engine.

Another object is to provide an electric-motor-driven vehicle wheel having an annular stator containing windings and an alternating current rotor of the squirrel-cage type forming a part of the rotary wheel, which carries the usual rim and tire.

Another object is to provide an electric-motor-driven vehicle wheel as set forth in the preceding objects, wherein the motor is so constructed as to be unharmed by water penetrating the motor, such as when the wheel passes through a puddle or traverses a ford in a stream.

Another object is to provide an electric-motor-driven vehicle wheel as set forth in the preceding objects wherein the rotor is mounted outside the stator and in turn has the tire rim mounted on its own periphery.

Another object is to provide an electric-motor-driven vehicle wheel, as set forth in the preceding objects, wherein the stator is prewound on a tubular holder or sleeve with flanged edges and is thereafter slipped over a stationary part of the wheel.

Figure 2:
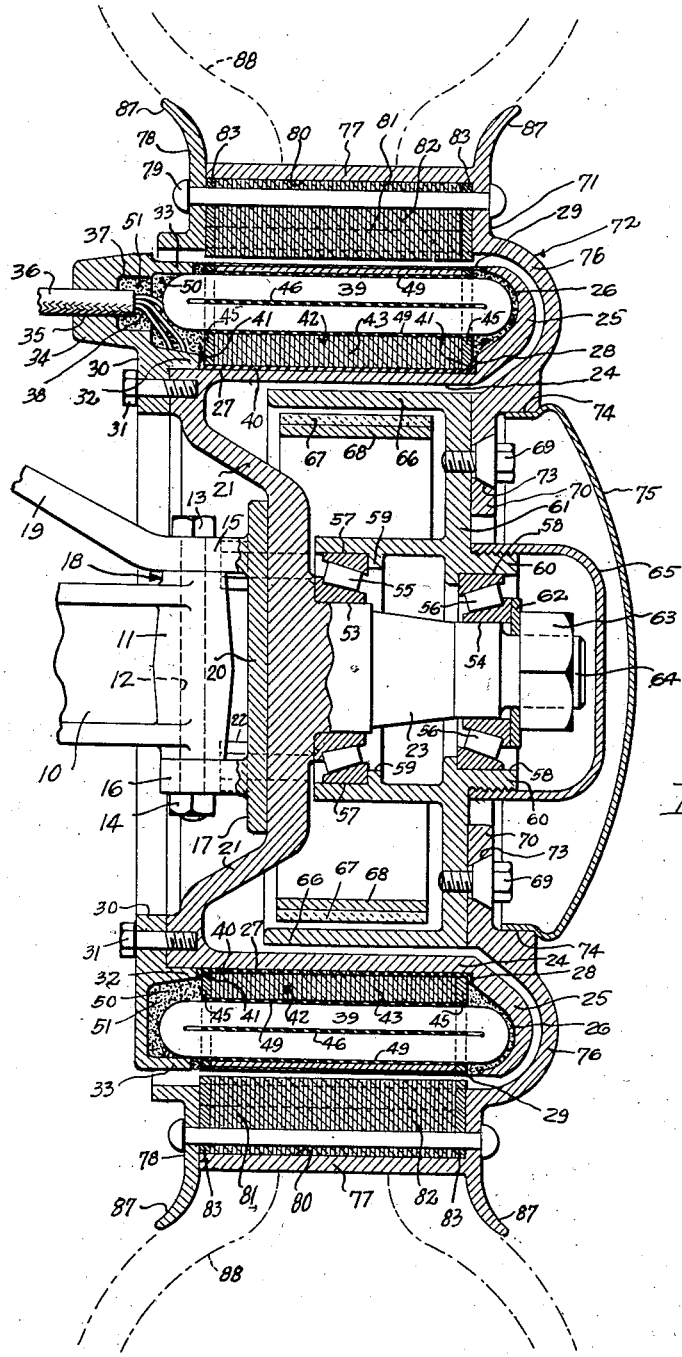

In the drawings:

Figure 1 is a side elevation, partly in section of an electric-motor-driven vehicle wheel, according to a preferred form of the invention, the tire being omitted; and Figure 2 is a central vertical section along the line 2—2 in Figure 1, with portions of the tire indicated by chain lines.

In general, the invention consists of a vehicle wheel having a self-contained alternating current electric motor of the squirrel-cage type, having a rim on the outside of the rotor upon which a vehicle tire is mounted. The motor is supplied with current from an alternating current generator which in turn is driven by a prime mover such as the engine of the vehicle. The generator may be of any suitable type and its details are beyond the scope of the present application.

Referring to the drawings in detail, Figures 1 and 2 show a vehicle axle 10, such as the front axle of an automobile, the axle 10 being of I-beam cross-section and having transverse bosses 11 at the opposite ends thereof. The bosses 11 are provided with transverse bores 12 containing king-pins 13 in the form of pivot bolts having lock nuts 14 on the ends thereof. Pivotally mounted upon the king-pins or pivot bolts 13 are the arms 15 and 16 of a bracket 17, the foregoing assembly forming a steering knuckle, generally designated 18. The upper arm 15 on the opposite side of the king-pin 13 is extended to form a steering arm 19 which is connected to the steering wheel of the car through any suitable conventional mechanism.

The bracket 17 has a plate-like base 20 to which the disc-like stator and wheel support 21 is secured, as by the bolts 22. The support 21 is dished inwardly from the boss 11 and at its central portion is provided with the outwardly-projecting axle 23. The periphery of the support 21 is provided with an axially-projecting drum portion 24 (Figure 2) extending entirely across the wheel and terminating in an outwardly-curved flange 25 of arcuate cross-section and having an annular recess 26 therein. The drum portion 24 has a cylindrical outer surface 27 terminating in an annular shoulder 28.

Mounted upon the surface 27 of the drum portion 24 is a stator unit 29 held in place by a ring 30 bolted as at 31 to the face of the support 21. The ring 30 is provided with concentric flanges 32 and 33 extending axially partway across the wheel and serving to retain the stator unit 29 in assembly. Projecting from the ring 30 is a boss 34 having a bore 35 through which a cable 36 passes into an internal recess 37, the cable 36 containing individual wires 38 leading to the various windings or coils 39 of the stator 29. The cable 36 is connected to an alternating current generator (not shown) which in turn is driven by a prime mover such as the engine of the vehicle (not shown).

The stator unit 29 is mounted upon a sleeve 40 which is slid over the surface 27 of the drum portion 24, the opposite edges being flanged as at 41 to retain the various parts of the stator unit 29 in assembly. The stator unit 29 contains an assembly 42 of annular laminated plates 43 of magnetizable material such as iron, these being preferably formed as stampings with radial slots 44 aligned axially around the periphery of the assembly 42, the plates 43 being held in assembly by retaining rings 45 abutting the flanged portions 41.

The windings 39 are in roughly annular form, looped between slots 44 at intervals around the periphery depending upon the number of poles of the motor. For example, in an eight-pole motor, the windings 39 would be looped between slots 44 which are 45 degrees apart around the periphery. Thus, each slot 44 contains the halves of two separate windings 39, one being superimposed upon the other and separated from one another by insulating strips 46. The windings 39 are held in position in the slots 44 by retaining strips 47 (Figure 1) with beveled edges fitting into dovetail slots 48. Insulating layers 49 surround each pair of coil or winding portions 39 in each slot 44 in order to insulate the windings from the plates 43. The coils 39 at their ends extend into the annular recess 26 and a recess 50 between the flanges 32 and 33, and are held in position by a sealing material 51. The plates 43 are held together by rivets 52 (Figure 1).

The axle 23 is provided with portions 53 and 54 for receiving the inner races of anti-friction bearings 55 and 56 respectively, the outer races of which are mounted in annular recesses 57 and 58 in the flanged portions 59 and 60 of the wheel 61. The assembly is held in position by a washer 62 and nut 63 threaded upon the outer end 64 of the axle 23. A hub cap 65 is also threaded upon the outer portion of the flange 60.

The wheel 61 is provided with a brake drum portion 66 (Figure 2), the inner surface of which is engaged by the lining 67 of a brake band 68. The latter is conventional and is operated by conventional mechanism, such as hydraulic mechanism, and its details form no part of the present invention.

Bolted as at 69 to the wheel 61 is the flanged portion 70 of a rim 71, forming a part of the rotor 72. The rim 71 is provided with an annular shoulder 74 for receiving a wheel disc 75 of any suitable type. The rim 71 is also provided with an outwardly curved annular portion 76 surrounding the flanged portion 25 of the stator 29 and spaced therefrom by a gap. The outer portion of the rim 71 is provided with a drum portion or felly 77 which is engaged by a retaining ring 78 (Figure 2), the parts being held in assembly by the fasteners 79. The rim 71, drum 77 and retaining ring 78 in assembly form an inwardly-facing annular recess 80 containing an assembly 81 of laminated plates 82, these being held in position by retaining rings 83. The laminated plates 82 are pierced at intervals around the periphery to receive the bars 84 forming the squirrel-cage elements of the induction motor. These bars are preferably of copper and are short-circuited at their ends by the plates or rings 83 so that they form a complete circuit in themselves. The laminated plates 82 and retaining rings 83 are provided with aligned slots 85 (Figure 1) at intervals around the periphery and communicating with elongated ports 86 aligned therewith for ventilation purposes. The ports 86 serve to carry away a portion of the heat generated during operation. The rim 71 is provided with the outwardly bent portions 87 for receiving and engaging the bead of an ordinary tire casing 88.

In operation, electricity is supplied to the conductors 38 within the cable 36 from a generator driven by the engine of the car, thereby energizing the coils 39. Due to their being looped between slots spaced at intervals around the periphery depending upon the number of poles of the motor, the portion of the coil 39 in one slot 44 will be opposite a north pole and in the other slot will be opposite a south pole, thereby providing a complete electro-magnetic circuit which results in a torque and consequent rotation of the rotor 72 relatively to the stator 29, in accordance with the performance characteristics of alternating current induction motors of the squirrel-cage type. This in turn propels the vehicle by rotating the tires 88. Thus, the vehicle is driven through an infinitely variable range of speeds by reason of the electro-magnetic drive thus provided. The vehicle may be driven through puddles or streams without injury, since the coils 39 are completely sealed by the sealing material 51 and are therefore in no danger of being short-circuited. The water entering the space between the stator 29 and rotor 72 is easily expelled when the vehicle again reaches dry ground and has no adverse effect upon the operation of the rotor 72. The stator 29, being pre-wound on its sleeve 40 and afterward slid into position upon the outer surface 27 of the drum portion 24, is easily replaced and repaired. While a front wheel unit has been described and illustrated, it will be evident that a substantially similar construction applies to the rear wheels, as the hub portions of each wheel are in themselves conventional. In the rear wheels, the bosses 11, king-pins 13 and arms 15, 16 and 19 will, of course, be omitted and replaced by the usual rear axle structure. It will also be seen that the present invention provides an individual drive for each wheel of the vehicle, thereby providing not only a great flexibility without mechanical complexity, but also enabling the individual wheels to be supported by individual spring suspension of conventional types.

What I claim is:

1. An electric motor wheel for vehicles comprising a stationary wheel support having an axle associated therewith, a wheel frame rotatably mounted on said axle, and an electric motor including a stator secured to said support and a rotor secured to said frame, said frame having an axially-extending tire-receiving rim thereon, said support having a drum portion and said stator having a sleeve member portion removably and slidably mounted on said drum portion.

2. An electric motor wheel for vehicles comprising a stationary wheel support having an axle associated therewith, a wheel frame rotatably mounted on said axle, and an electric motor including a stator secured to said support and a rotor secured to said frame, said frame having an axially-extending tire-receiving rim thereon, said support having a drum portion and said stator having a sleeve member portion removably and slidably mounted on said drum portion, said stator also including laminated stator plates mounted on said sleeve portion and stator windings mounted on said plates.

3. An electric motor wheel for vehicles comprising a stationary wheel support having an axle associated therewith, a wheel frame rotatably mounted on said axle, and an electric motor including a stator secured to said support and a rotor secured to said frame, said frame having an axially-extending tire-receiving rim thereon, said support having a drum portion and said stator having a sleeve member portion removably and slidably mounted on said drum portion, said stator also including peripherally-recessed laminated stator plates mounted in said recesses on said sleeve portion and stator windings mounted on said plates.

FRANK L. GLADISH.

REFERENCES CITED

The following references are of record in the file of this patent:

UNITED STATES PATENTS

| Number | Name | Date |
|---|---|---|
| 703,649 | Gill | July 1, 1902 |
| 1,270,420 | Kingsbury | June 25, 1918 |
| 1,577,304 | Schurch | Mar. 16, 1926 |
| 1,652,492 | Naul | Dec. 13, 1927 |